(12) United States Patent
Sato et al.

(10) Patent No.: US 7,239,601 B2
(45) Date of Patent: Jul. 3, 2007

(54) OPTICAL RECORDING MEDIUM, METHOD OF MANUFACTURING OPTICAL RECORDING MEDIUM, APPARATUS FOR MANUFACTURING OPTICAL RECORDING MEDIUM, PROGRAM, AND MEDIUM

(75) Inventors: Shuji Sato, Neyagawa (JP); Kenichi Nishiuchi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 903 days.

(21) Appl. No.: 10/169,462

(22) PCT Filed: Nov. 2, 2001

(86) PCT No.: PCT/JP01/09650

§ 371 (c)(1),
(2), (4) Date: Oct. 23, 2002

(87) PCT Pub. No.: WO02/37483

PCT Pub. Date: May 10, 2002

(65) Prior Publication Data
US 2003/0076775 A1    Apr. 24, 2003

(30) Foreign Application Priority Data
Nov. 6, 2000  (JP) ............................. 2000-337091
Aug. 8, 2001  (JP) ............................. 2001-240832

(51) Int. Cl.
*G11B 7/24*  (2006.01)

(52) U.S. Cl. .................. 369/275.3; 369/94; 369/275.1; 369/283; 369/286; 428/64.1

(58) Field of Classification Search ..................... None
See application file for complete search history.

(56) References Cited

U.S. PATENT DOCUMENTS

| 5,430,281 | A | 7/1995 | Lentz et al. |
| 5,484,686 | A | 1/1996 | Maeda et al. |
| 5,661,800 | A | 8/1997 | Nakashima et al. |

(Continued)

FOREIGN PATENT DOCUMENTS

| CN | 1039920 A | 2/1990 |

(Continued)

OTHER PUBLICATIONS

European Search Report corresponding to application No. EP 01-98-2735 dated Feb. 25, 2005.

(Continued)

*Primary Examiner*—Andrea Wellington
*Assistant Examiner*—Jorge L. Ortiz-Criado
(74) *Attorney, Agent, or Firm*—RatnerPrestia

(57) ABSTRACT

There are some cases that an accuracy is low for reading unique information identifying an individual from an optical disk which comprises a plurality of information layers.

The optical disk according to the present invention is an optical disk which comprises a first information layer and a second information layer for holding information so that, by incident light, (1) the information will be reproduced or (2) the information will be recorded and reproduced. The optical disk comprises a BCA area which is formed in the first information layer and in which individual identification information uniquely given to the optical disk is recorded.

4 Claims, 10 Drawing Sheets

U.S. PATENT DOCUMENTS

| | | | |
|---|---|---|---|
| 5,761,301 A | | 6/1998 | Oshima et al. |
| 6,052,465 A | | 4/2000 | Gotoh et al. |
| 6,295,262 B1 | * | 9/2001 | Kusumoto et al. ....... 369/53.37 |

FOREIGN PATENT DOCUMENTS

| | | | |
|---|---|---|---|
| EP | 0713217 | | 5/1996 |
| EP | 0 741 382 | | 11/1996 |
| EP | 0 807 929 | | 11/1997 |
| EP | 1124221 | | 8/2001 |
| EP | 1-282-125 A1 | | 2/2003 |
| JP | 03-157816 | | 7/1991 |
| JP | 06-203412 | | 7/1994 |
| JP | 08-147762 | | 6/1996 |
| JP | 08-255347 A | | 10/1996 |
| JP | 10289486 A | * | 10/1998 |
| JP | 2000-011453 | | 1/2000 |
| JP | 2000-76705 | | 3/2000 |
| WO | WO 98/58368 A | | 12/1998 |
| WO | WO 00/23990 | | 4/2000 |
| WO | WO 01/73784 A1 | | 10/2001 |

OTHER PUBLICATIONS

European Search Report corresponding to application No. EP 01-98-2735 dated Dec. 6, 2004.

Chinese Official Action dated May 14, 2004, for Application No. 01803539.6 with partial English translation.

Japanese search report for PCT/JP01/09650 dated Mar. 12, 2002.

English translation of Form PCT/ISA/210.

* cited by examiner (3a) APPLICATION STEP (3b) THIN FILM SHEET STACKING STEP (3c) SPINNING STEP (3d) UV LIGHT IRRADIATING STEP (3e) SEPARATION STEP Fig. 7
(7a) FIRST SUBSTRATE MANUFACTURING STEP
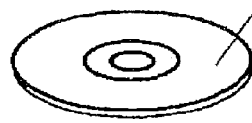
(7b) FIRST INFORMATION LAYER FORMING STEP
(7c) INITIALIZATION AND IDENTIFICATION INFORMATION RECORDING STEP
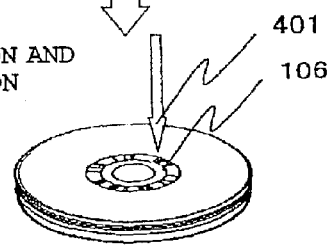
(7d) APPLICATION STEP
(7e) TRANSFER STEP
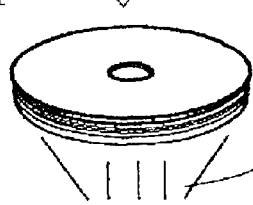
(7f) SEPARATION STEP
(7g) SECOND INFORMATION LAYER FORMING STEP
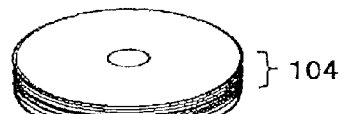
(7h) BONDING STEP
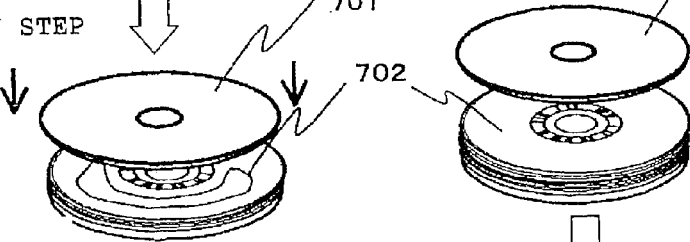
(7i) UV LIGHT IRRADIATING STEP
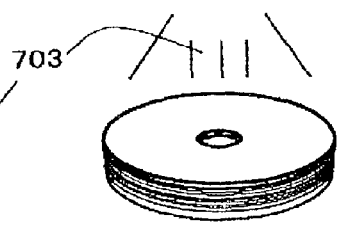

OPTICAL RECORDING MEDIUM, METHOD OF MANUFACTURING OPTICAL RECORDING MEDIUM, APPARATUS FOR MANUFACTURING OPTICAL RECORDING MEDIUM, PROGRAM, AND MEDIUM

This Application is a U.S. National Phase Application of PCT International Application PCT/JP01/09650.

FIELD OF THE INVENTION

The present invention relates to an optical recording medium, a method of manufacturing optical recording medium, an apparatus of manufacturing optical recording medium, a program, and a medium.

BACKGROUND OF THE INVENTION

Over the recent years, as the volume of information required by audio/video equipment has increased, an increased attention has been paid to disk-shaped optical recording mediums, or so-called optical disks, which allow an easy access to data, storage of a large volume of data and superiority in reduction of the sizes of equipment. Optical disks include reproduction-only optical disks, write-once-read-many optical disks, phase-change type optical disks and magnetic optical disks as read-write optical disks, etc., which are called CDs, DVDs, MOs and the like and used in a variety of actual applications. An information layer in such an optical disk, if the disk is a reproduction-only optical disk for instance, is comprised of a synthetic resin substrate, in which convex and concave pit arrays are formed in a spiral arrangement in accordance with recorded information, and a metal thin film of gold, aluminum or other substance which covers the pit arrays on the synthetic resin substrate and serves as a reflection film for reproduction laser light.

Meanwhile, as structure elements of the information layer, a write-once-read-many optical disk or rewritable optical disk comprises a synthetic resin substrate in which a tracking groove pattern is mainly recorded, a recording film such as a dye recording film and a phase-change recording film, and further, in accordance with necessity, a reflection film which reflects reproduction laser light. As the recording film, a thin film which assumes two states that can be detected by means of laser irradiation is used. Information is reproduced, as convex and concave pits formed on a synthetic resin substrate in the case of a reproduction-only optical disk, but marks formed in a recording film on grooves in the case of a write-once-read-many optical disk or rewritable optical disk, reflect reproduction laser light, and as whether there are pits or marks, the length of a pit or mark and the interval between pits or marks are determined from changes in intensity of the reflection light.

These synthetic resin substrates are manufactured by injection molding of a synthetic resin such as polycarbonate, using a metallic molding board of Ni in general which includes a convex and concave pit pattern or groove pattern and is referred to as "a stamper." An injection molding method permits to quickly manufacture a large number of synthetic resin substrates which contain the same information, using the same stamper. However, since thus manufactured synthetic resin substrates were all transferred from the same stamper, the pit or groove pattern remains entirely identical and so does the information.

This necessitates identification information unique to an individual, for managing optical disks. This is for the purpose of prevention of unauthorized copying is aimed at from a perspective of copyright protection, for example. Such identification information is different between individual mediums, and hence, can not be created using an injection molding method mentioned above. In addition, it must be ensured that the information can not be rewritten with ordinary optical disk recording/reproducing apparatuses which are generally available in the market. Noting this, proposals have been made regarding techniques for recording unique identification information which is different among individuals by a different method other than an injection molding method.

As a method of additionally recording information on a DVD, there is a standard with respect to recording of additional information in a form which resembles a barcode which is an aggregation of diametrical parallel lines. This recording standard stipulates standardized recording areas, modulation scheme, error correction scheme, etc.

This method, for a DVD-ROM for instance, requires to irradiate laser light upon an information layer inside a fabricated optical disk, dissolve and remove a metal thin film which forms the information layer, and define a barcode-like pattern having different reflection coefficients between the removed portions and the surrounding information layer.

There is alternatively a method which does not utilize dissolution of the metal thin film but requires to irradiate laser light upon the substance of the information layer inside the optical disk, change the reflection coefficient by changing a chemical, physical or optical property, and accordingly record information. An optical disk in which a phase-change recording film or a dye recording film is used as the substance of the information layer for instance corresponds to this.

In this manner, it is possible to specify the origin of the optical disk based on the unique information, prohibit illegal copying of the information, and protect the copyright. Further, as the identification information, a production lot number, a production date and the like are written on every disk in some cases, for other purposes such as production management.

A conventional optical disk comprises a first reproduction-only area of BCA (Burst Cutting Area, or sometimes information recorded in BCA) or the like, a second dedicated area formed by pre-pits, and a data area.

The first reproduction-only area is for recording unique information which identifies an individual as described above, while written in the second reproduction-only area is data such as a molding board number for the optical disk and an intensity value of optimal laser light for reading data recorded on this optical disk. The second reproduction-only area is also called "a lead-in area." If the disk is a reproduction-only optical disk, a content is recorded in the data area, but user information is recorded in the data area if the disk is a read-write optical disk.

However, with the conventional BCA recording method, since BCA recording is executed after a plurality of layers are bonded to each other, recording takes place over a plurality of mutually stacked information layers. This may result in a deteriorated accuracy of reading the unique information which identifies an individual, or even in a complete failure of data read in the worst situation. (In the case of a rewritable optical disk, in some cases, optimization of recording in each information layer becomes difficult, which in turn obstructs perfect crystallization or exerts an influence such as deformation induced by excessive heat.)

In addition, since the area dedicated to BCA recording which is large but has a small capacity gets occupied when the conventional BCA recording method is used, a read-write area which is originally intended for writing of data may shrink and a substantial recording capacity may accordingly decrease. For instance, the occupied area described above is as wide as 1.2 mm in a DVD-ROM.

DISCLOSURE OF THE INVENTION

Considering the problems above with the conventional techniques, the present invention aims at providing an optical recording medium, a method of manufacturing optical recording medium, an apparatus of manufacturing optical recording medium, a program, and a medium, with which it is possible to improve an accuracy of reading unique information which identifies an individual from an optical disk which comprises a plurality of information layers.

In light of the problems above with the conventional techniques, the present invention also aims at providing an optical recording medium, a method of manufacturing optical recording medium, an apparatus of manufacturing optical recording medium, a program, and a medium, with which it is possible to reduce a dedicated area which is for recording unique information which identifies an individual.

One aspect of the present invention is an optical recording medium which comprises a plurality of information layers for holding information so that by means of incident light, (1) said information will be reproduced or (2) said information will be recorded and reproduced, comprising a unique identification information recording area in which unique identification information uniquely given to said optical recording medium is recorded and which is disposed in one of said plurality of information layers.

Another aspect of the present invention is the optical recording medium, wherein said unique identification information recording area is disposed in the information layer among said plurality of information layers which is the closest to a surface upon which said light is incident.

Still another aspect of the present invention is the optical recording medium, wherein said plurality of information layers are formed on predetermined substrates, and said unique identification information recording area is disposed in the information layer among said plurality of information layers which is formed on the thickest one of said substrates.

Yet still another aspect of the present invention is an optical recording medium which comprises a plurality of information layers for holding information so that by means of incident light, (1) said information will be reproduced or (2) said information will be recorded and reproduced, comprising unique identification information recording areas in which unique identification information uniquely given to said optical recording medium is recorded and which are disposed in two or more of said plurality of information layers so as not to overlap with each other as viewed from a direction in which said light is incident.

Still yet another aspect of the present invention is the optical recording medium, wherein said plurality of information layers are formed on a substrate which has the shape of a disk, and said unique identification information is recorded in the form of stripes which are along the radial direction of said disk.

A further aspect of the present invention is the optical recording medium, wherein said plurality of information layers are formed mainly by thin films which can assume two states which are irreversible and can be detected when irradiated with a laser.

A still further aspect of the present invention is the optical recording medium, wherein said plurality of information layers are formed mainly by thin films which can be dissolved and accordingly removed by irradiation of light.

A yet further aspect of the present invention is an optical disk which comprises an information layer for holding information so that by means of incident light, (1) information will be reproduced or (2) information will be recorded and reproduced, comprising a predetermined position information recording area in which information regarding a position at which unique identification information, which is given uniquely to said optical disk is recorded, is recorded.

A still yet further aspect of the present invention is the optical recording medium, wherein said position information recording area is a BCA area or lead-in area which is used for reproduction of said information.

An additional aspect of the present invention is the optical recording medium, wherein said unique identification information is recorded in a data area in which said information is recorded or which is used to record said information.

A still additional aspect of the present invention is the optical recording medium, wherein said unique identification information is recorded so as to have a length which permits error correction during reproduction of said information.

A yet additional aspect of the present invention is the optical recording medium, wherein said information layer is formed on a substrate which comprises a plurality of recording tracks and has the shape of a disk, wherein said unique identification information is recorded so as to have a width which is not beyond one of said recording tracks.

A still yet additional aspect of the present invention is an optical recording medium manufacturing method of manufacturing an optical recording medium comprising a plurality of information layers for holding information so that by means of incident light, (1) said information will be reproduced or (2) said information will be recorded and reproduced, comprising a step of forming a unique identification information recording area in one of said plurality of information layers, and recording unique identification information, which is given uniquely to said optical disk, in said unique identification information recording area.

A supplementary aspect of the present invention is an optical recording medium manufacturing method of manufacturing an optical recording medium comprising a plurality of information layers for holding information so that by means of incident light, (1) said information will be reproduced or (2) said information will be recorded and reproduced, comprising a step of forming unique identification information recording areas in two or more of said plurality of information layers so as not to overlap with each other as viewed from a direction in which said light is incident, and recording unique identification information, which is given uniquely to said optical disk, in said unique identification information recording areas.

A still supplementary aspect of the present invention is an optical recording medium manufacturing method of manufacturing an optical recording medium comprising an information layer for holding information so that by means of incident light, (1) information will be reproduced or (2) information will be recorded and reproduced, comprising:

a step of recording unique identification information which is given uniquely to said optical recording medium; and a step of forming a predetermined position information recording area and recording, in said position information recording area, information regarding a position at which said unique identification information is recorded.

A yet supplementary aspect of the present invention is the optical recording medium manufacturing method, wherein said information layer is formed mainly by a phase-change recording film, and said unique identification information is recorded utilizing a modulated intensity of laser light which is for initially crystallizing said phase-change recording film.

A still yet supplementary aspect of the present invention is the optical recording medium manufacturing method, wherein said information layer is formed mainly by a reflection film against said light which is indecent, and said unique identification information is recorded utilizing dissolution and consequent removal of said reflection film.

Another aspect of the present invention is an optical recording medium manufacturing apparatus of manufacturing an optical recording medium comprising a plurality of information layers for holding information so that by means of incident light, (1) said information will be reproduced or (2) said information will be recorded and reproduced, comprising unique identification information recording means which records unique identification information, which is given uniquely to said optical recording medium, in a unique identification information recording area which is formed in one of said plurality of information layers.

Still another aspect of the present invention is an optical recording medium manufacturing apparatus of manufacturing an optical recording medium comprising a plurality of information layers for holding information so that by means of incident light, (1) said information will be reproduced or (2) said information will be recorded and reproduced, comprising unique identification information recording means which records unique identification information, which is given uniquely to said optical recording medium, in unique identification information recording areas which are formed in two or more of said plurality of information layers so as not to overlap with each other as viewed from a direction in which said light is incident.

Yet still another aspect of the present invention is an optical recording medium manufacturing apparatus of manufacturing an optical recording medium comprising an information layer for holding information so that by means of incident light, (1) said information will be reproduced or (2) said information will be recorded and reproduced, comprising:

unique identification information recording means which records unique identification information which is given uniquely to said optical recording medium; and position information recording means which records, in a predetermined position information recording area, information regarding a position at which said unique identification information is recorded.

Still yet another aspect of the present invention is the optical recording medium manufacturing apparatus, wherein said information layers are formed on a substrate which comprises a plurality of recording tracks and has the shape of a disk, and said unique identification information recording means records said unique identification information, utilizing tracking servo over said tracking tracks.

A further aspect of the present invention is a program which makes a computer execute the step in the optical recording medium manufacturing method of forming said unique identification information recording area in one of said plurality of information layers and recording said unique identification information in said unique identification information recording area.

A still further aspect of the present invention is a medium which can be processed on a computer and holds a program which makes a computer execute the step in the optical recording medium manufacturing method of forming said unique identification information recording area in one of said plurality of information layers and recording said unique identification information in said unique identification information recording area.

A yet further aspect of the present invention is a program which makes a computer execute the step in the optical recording medium manufacturing method of forming said unique identification information recording areas in two or more of said plurality of information layers so as not to overlap with each other as viewed from the direction in which said light is incident, and recording said unique identification information, which is given uniquely to said optical disk, in said unique identification information recording areas.

A still further aspect of the present invention is a medium which can be processed on a computer and holds a program which makes a computer execute the step in the optical recording medium manufacturing method of forming said unique identification information recording areas in two or more of said plurality of information layers so as not to overlap with each other as viewed from the direction in which said light is incident, and recording said unique identification information, which is given uniquely to said optical disk, in said unique identification information recording areas.

An additional aspect of the present invention is a program which makes a computer execute all or some of the step in the optical recording medium manufacturing method of recording said unique identification information which is given uniquely to said optical recording medium, and the step in the optical recording medium manufacturing method of forming said predetermined position information recording area and recording, in said position information recording area, the information regarding the position at which said unique identification information is recorded.

A still additional aspect of the present invention is a medium which can be processed on a computer and holds a program which makes a computer execute all or some of the step in the optical recording medium manufacturing method of recording said unique identification information which is given uniquely to said optical recording medium, and the step in the optical recording medium manufacturing method of forming said predetermined position information recording area and recording, in said position information recording area, the information regarding the position at which said unique identification information is recorded.

BRIEF DESCRIPTION OF THE DRAWINGS

FIG. 7 is a drawing which shows steps of manufacturing an optical disk according to a second preferred embodiment;

Figure 1:
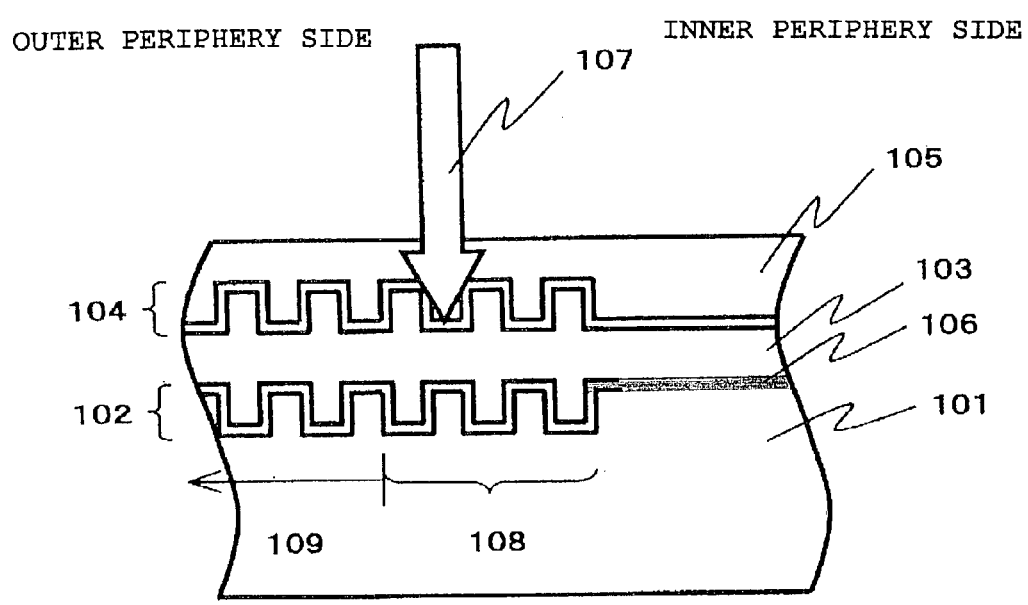
FIG. 1 is a cross sectional view of an optical recording medium according to a first preferred embodiment.

EXPLANATION OF THE REFERENCE SYMBOLS 101 first substrate
102 first information layer
103 intermediate layer
104 second information layer
105 second substrate
106 individual identification information
107 read-write light
108, 902 lead-in area
109, 204 data area
201 glass substrate
202 photoresist
203 metal plate
204, 301, 701 stamper
302, 402, 702 UV light hardening resin
303 thin film sheet
304, 403, 703 UV light
401 individual identification information recording beam
501 information recording area
502 holding hole
601 laser beam shaping optical system
602 motor
603 rotary encoder
604 intensity modulator
605 individual identification information signal generator
901 BCA area
902 learning area
1001 user data
1002 mark identifying an individual

BEST MODE FOR IMPLEMENTING THE INVENTION

Preferred embodiments of the present invention will now be described with reference to associated drawings.

For ease of understanding, an explanation common to a first through a third preferred embodiments will be given before describing these preferred embodiments in detail.

FIG. 1 is a drawing of an optical recording medium, an optical disk in particular, according to the first and the second preferred embodiments. Shown in FIG. 1 is a particular example that there are only two information layers.

The optical disk according to these comprises a first substrate 101 in which convex and concave recording tracks are formed, a first information layer 102 which is disposed to the first substrate on the side where the recording tracks are formed, an intermediate layer 103 which is located between the first information layer 102 and a second information layer 104 and is approximately transparent to read-write light 107, the second information layer 104, and a second substrate 105 which is approximately transparent to the read-write light 107.

The thickness of the second substrate 105 is about 0.1 mm so that aberration of the read-write light as it converges will be small and a tolerance to the inclination of a disk surface will be large when a recording capacity is 20 GB or more and a reproducing head has NA of 0.7 or more. The total thickness of the optical disk is about 1.2 mm, considering the rigidity of the disk and the compatibility with a CD or DVD. Hence, the thickness of the first substrate 101 is about 1.1 mm.

Reproduction is realized, as the read-write light 107 impinges upon a disk surface of the second substrate 105 side and converges at the first information layer 102 or the second information layer 104 and a reflection intensity of thus reflected read-write light 107 is observed. When recording is possible, recording is realized similarly to reproduction in a manner that the read-write light 107 is converged at the first information layer 102 or the second information layer 104 and the index of refraction of a first phase-change recording film or a second phase-change recording film which forms the information layer is changed.

Information 106 which identifies an individual is recorded in the lead-in area 108 or a BCA area (area located on the inner periphery side to the lead-in area 108) which is present only in the first information layer 102 and does not include the convex and concave recording tracks. Recording of the information which identifies an individual is realized as the phase and hence the index of refraction of a first phase-change recording film or a second phase-change recording film are changed. These changes are irreversible and read-only.

The information 106 which identifies an individual (individual identification information) corresponds to unique identification information according to the present invention. Meanwhile, corresponding to a unique identification information recording area according to the present invention is a portion within the first information layer in the BCA area and the portion 108 within the first information layer in the lead-in area 102 according to the first and the second preferred embodiments.

The information layers may be formed by reflection films of gold or the like, in which case the information which identifies an individual is recorded as the reflection films are dissolved and accordingly removed. As the information which identifies an individual is recorded in one information layer out of the two information layers, recording which is optimal to the information layer which is to perform recording in is realized, and further, since there is no influence from the other one of these layers, it is possible to manufacture an optical disk which allows an improved reading accuracy.

In addition, as described later in relation to the third preferred embodiment, information indicating the position of the information 106 which identifies an individual (information regarding the position at which the unique identification information is recorded) may be recorded in the lead-in area 108 or the like which serves as a position information recording area. In this case, the content of the information is the total number of the layers, the current layer, which one of the layers contains the information which identifies an individual, where a radial position or address of the recording is positioned or the like, in addition to information which is necessary for ordinary reproduction. However, the present invention is applicable to even where there are not a plurality of layers. Since this allows to specify a position of the information which identifies an individual, an easy and quick access is possible.

Further, the information recorded in the BCA may not be the content of the information identifying an individual, but may be information which indicates the position at which the information identifying an individual is recorded. In short, information indicative of the position is information such as a layer, an address, etc. If address information alone is used, the volume of data to be recorded is reduced, which in turn allows to reduce the area. An example that a recording area to identify an individual is a data area will be described in detail in relation to the third preferred embodiment.

FIRST PREFERRED EMBODIMENT

Figure 4:
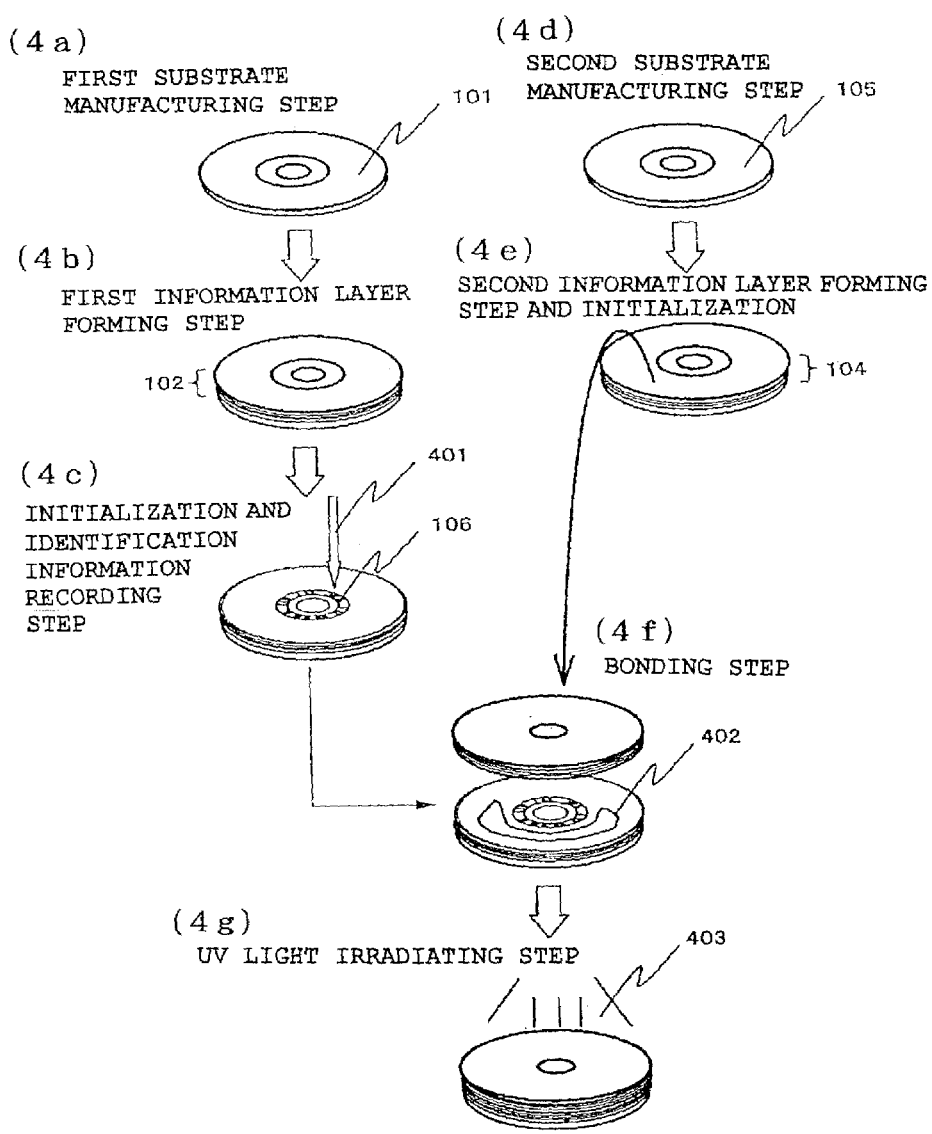
FIG. 4 is a drawing which shows steps of manufacturing an optical disk according to the first preferred embodiment.

FIG. 4 is a drawing which shows steps of manufacturing an optical disk according to the first preferred embodiment which comprises the first information layer 102 and the second information layer 104 for holding information so that by means of incident light, (1) the information will be reproduced or (2) the information will be recorded and reproduced, and comprises the BCA area disposed in the first information layer 102 in which the individual identification information 106 uniquely given to the optical disk is recorded.

First, methods of manufacturing the first substrate 101 and the second substrate 105 will be illustrated. A detailed description will be provided later on recording of the information 106 (unique identification information) identifying an individual in an optical recording medium manufacturing apparatus (FIG. 6) which comprises a laser 401, which is a characteristic according to the first preferred embodiment.

Figure 2:
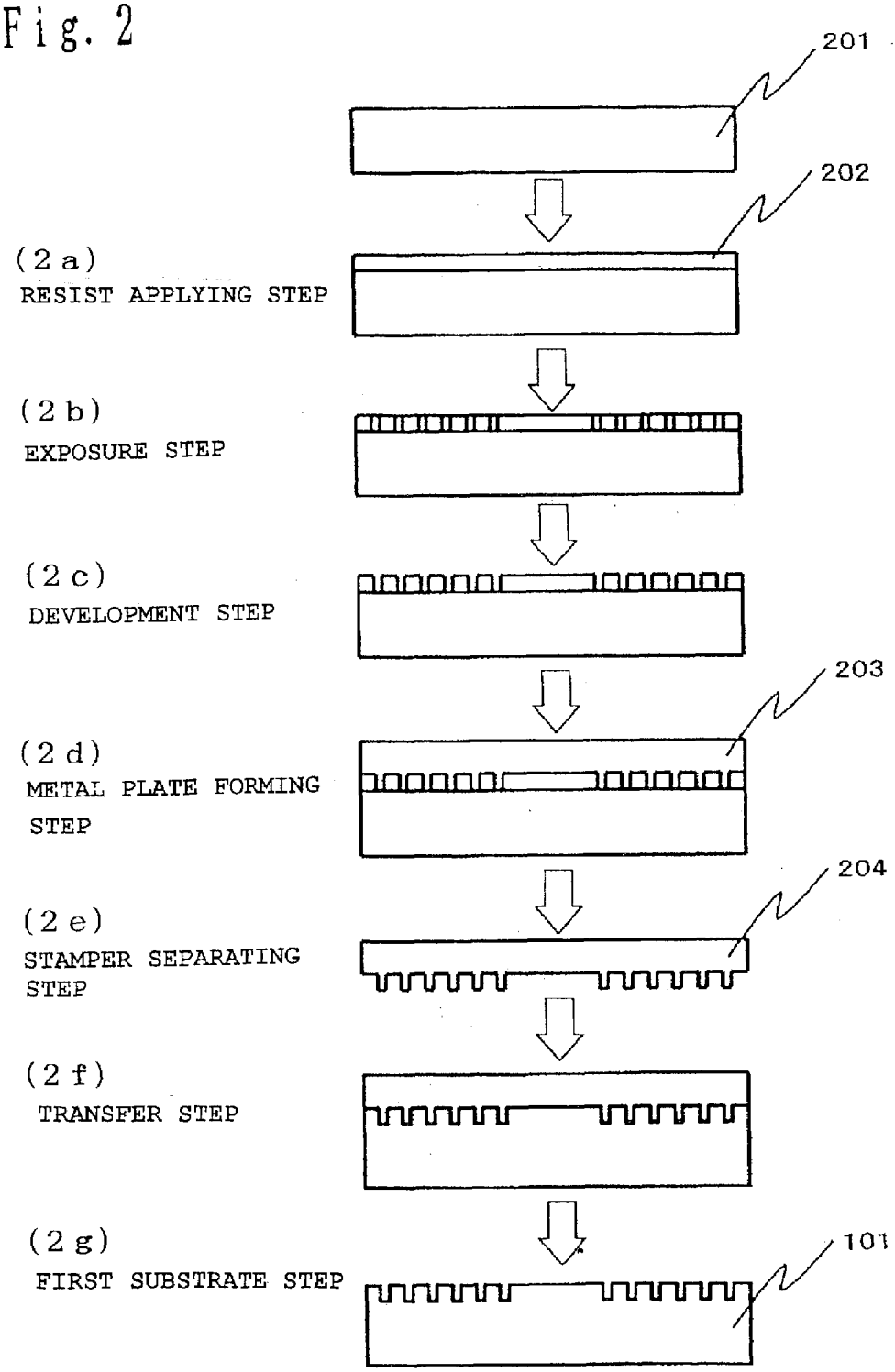
FIG. 2 is a drawing which shows a method of manufacturing a first substrate according to the first preferred embodiment.

FIG. 2 is a drawing which shows a method of manufacturing the first substrate 101. A photoresist 202 is applied to a glass board 201 (Step (2a)) and exposed (Step (2b)). After development (Step (2c)), sputtering with Ni and plating with Ni are executed to form a metal plate 203 (Step (2d)), and the metal plate 203 is peeled off (Step (2e)), whereby a stamper 204 is obtained. Using thus manufactured stamper 204, by a method such as injection molding, the shape of the stamper 204 is transferred onto a synthetic resin such as polycarbonate (Step (2f)) and the first substrate 101 is consequently obtained. Since the first substrate 101 does not transmit the read-write light, the first substrate 101 may be made of a substance such as glass and metal by the 2P method or the like.

Figure 3:
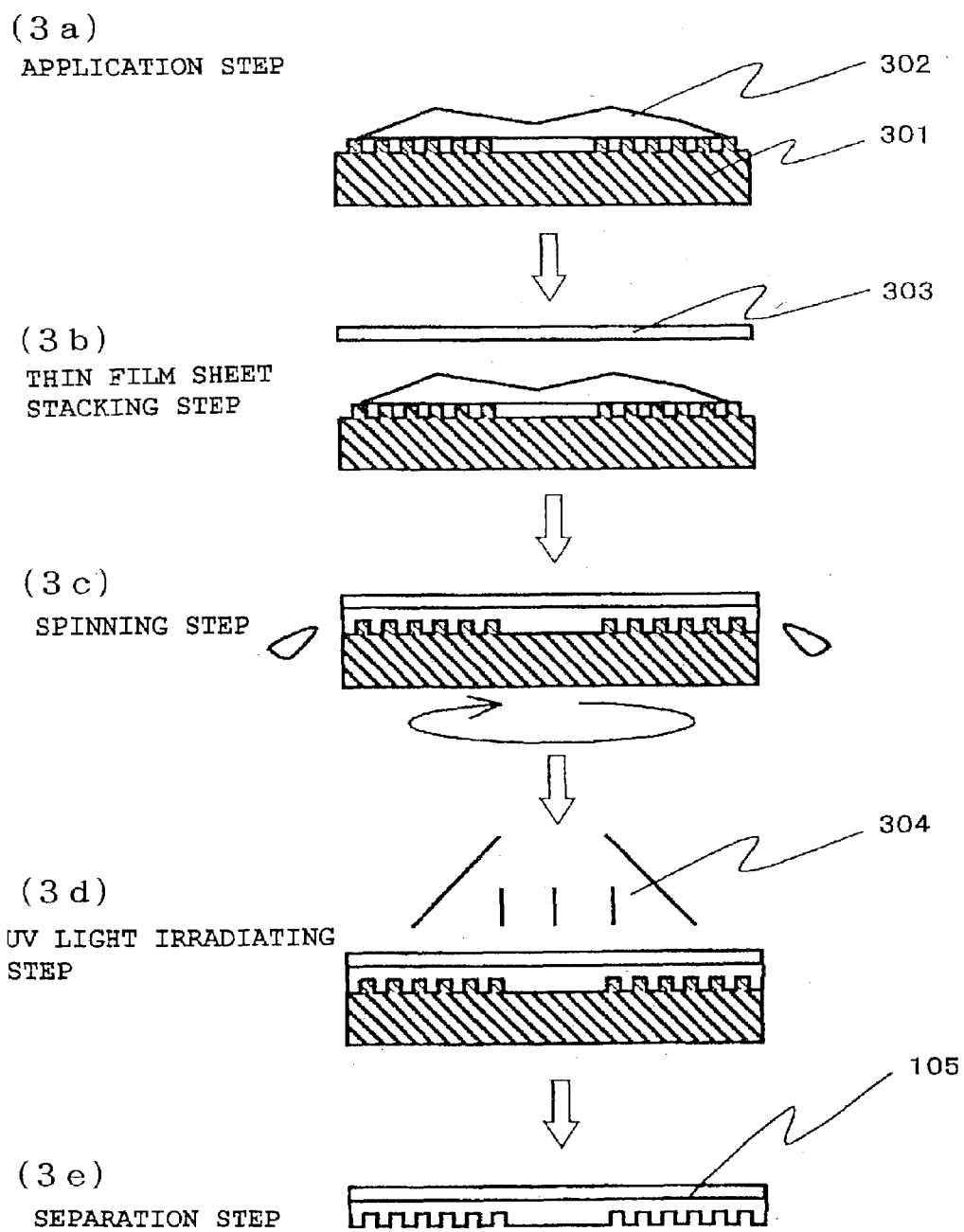
FIG. 3 is a drawing which shows a method of manufacturing a second substrate according to the first preferred embodiment.

Next, FIG. 3 is a drawing which shows a method of manufacturing the second substrate 105. Used as a stamper is a stamper which is manufactured by a method similar to that shown with the steps for forming the first substrate. A UV light hardening resin 302 is applied to a stamper 301 (Step (3a)), and a thin film sheet 303, which is of a synthetic resin such as polycarbonate and has thickness of about 0.1 mm, is bonded to the top of this (Step (3b)). After rotating the stamper 301 and the thin film sheet 303 and removing an excessive portion of the UV light hardening resin such that the UV light hardening resin 302 will have desired film thickness (Step (3c)), UV light 304 is irradiated so as to harden the UV light hardening resin 302 (Step (3d)) The interface between the stamper 301 and the UV light hardening resin 302 is separated, whereby the second substrate 105 is obtained (Step (3e)).

Thus manufactured first substrate 101 and second substrate 105 respectively have recording tracks which are reverse convex and concave to those of the stampers. The convex and concave recording tracks are formed by pits or groove patterns which are in a spiral arrangement, and located within a range of an inner peripheral diameter of about 23 mm to an outer peripheral diameter of about 59 mm (Step (4a)).

Meanwhile, in the case of a rewritable optical disk, over the convex and concave recording tracks formed on the first substrate 101 and the second substrate 105, the first information layer 102 and the second information layer 104 are respectively formed (Step (4b), Step (4e)). The information layers are formed by phase-change recording films which are rewritable and held between dielectric films, and reflection films formed by metal thin films such as aluminum, silver alloy or the like is further disposed in accordance with necessity. The dielectric films, the phase-change recording films and the reflection films are formed by a sputtering method or the like. Since recording on and reproduction from the optical disk are from the second substrate 105 side, as for the first information layer 102, the metal thin film, the dielectric film, the phase-change recording film and the dielectric film are disposed in this order, and as for the second information layer 104, the dielectric film, the phase-change recording film and the dielectric film are disposed in this order. At this stage, the second information layer 104 in which the individual identification information is not to be recorded is initially crystallized over the entire surface (However, such initial crystallization may be omitted during manufacturing of a reproduction-only optical disk (ROM.).

In the case of a reproduction-only optical disk, for the purpose of reflecting the read-write light, a metal thin film of aluminum, silver alloy or the like is formed over the convex and concave recording tracks which are formed on the first substrate 101 and the second substrate 105. Meanwhile, in the case of a write-once-read-many optical disk, a dye recording film is formed over the convex and concave recording tracks.

Next, the information 106 which identifies an individual is recorded in the first information layer 102 (Step (4c)). The information is recorded as a stripe-like barcode, which has a low reflection coefficient with respect to the read-write light and is an aggregation of diametrical parallel lines, is formed in an inner peripheral portion of the area in which there are the convex and concave recording tracks, whereas the other area is subjected to initial crystallization. The recorded area is however irreversible. Further, in the case of a reproduction-only optical disk comprising only a reflection film instead of a phase-change recording film, recording is realized by a method which requires to dissolve and accordingly remove the reflection film.

After the recording in the first information layer 102, the first substrate 101 and the second substrate 105 are bonded to each other (Step (4*f*)). A UV light hardening resin 402 is applied onto the first information layer 102, and the second substrate 105 is bonded such that the second information layer 104 will be faced with the first information layer 102. Thus bonded substrate is rotated in such a manner that the UV light hardening resin 402 will have desired film thickness. The thickness is set to such thickness which will not be affected between the information layers but cause minimum aberration of the read-write light. At last, UV light 403 is irradiated and the UV light hardening resin 402 is accordingly hardened, thereby completing the disk.

Figure 5:
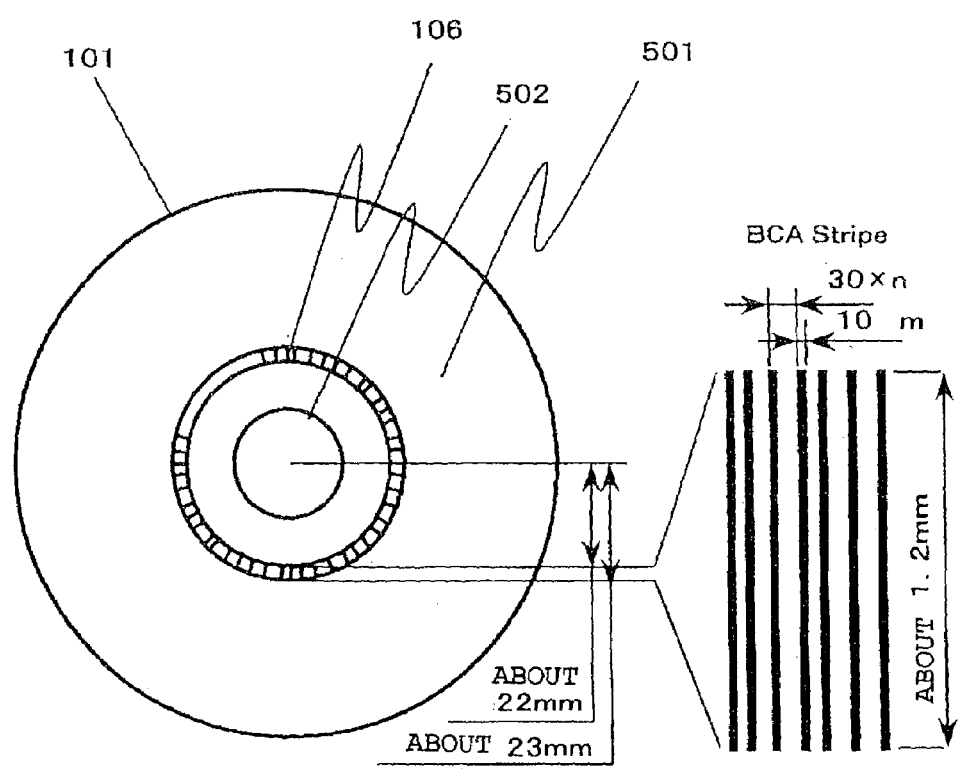
FIG. 5 is an appearance view of information which identifies an individual according to the first preferred embodiment.
Figure 6:
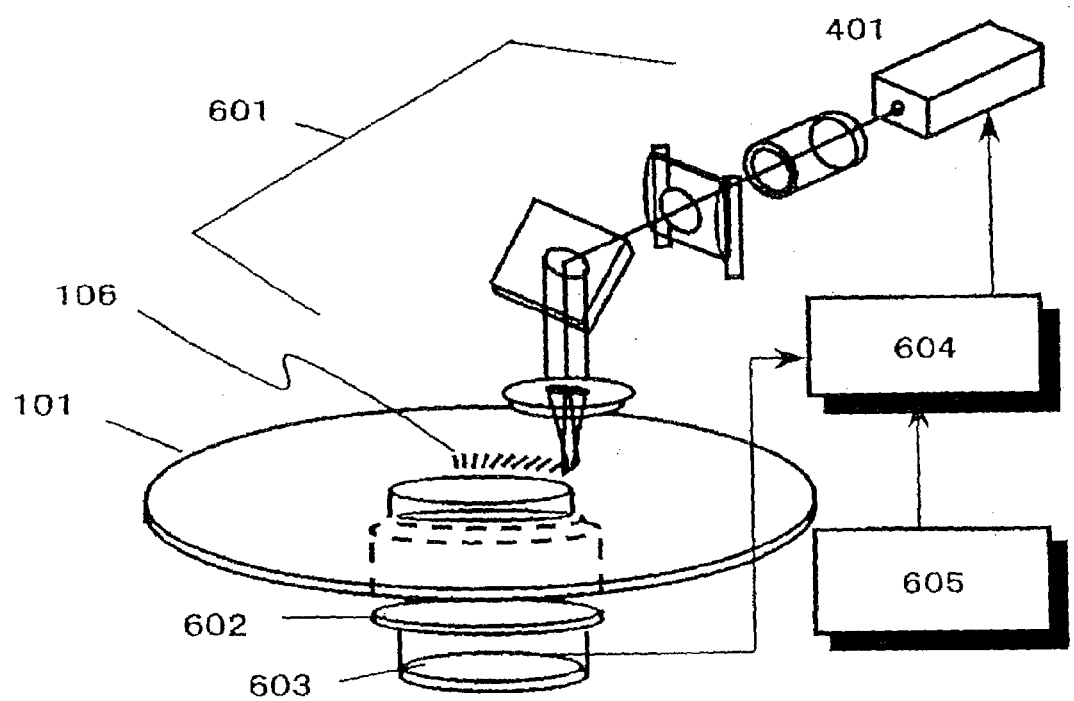
FIG. 6 is a drawing which shows a method of recording individual identification information according to the first preferred embodiment.

A method of recording the information which identifies an individual will now be described in detail. FIG. 5 shows the appearance of the individual identification information, and FIG. 6 shows a method of recording the individual identification information. A hole 502 of a diameter of about 15 mm for holding an optical disk is formed in a central portion, an information recording area 501 comprising the convex and concave recording tracks is formed within a radial range of about 23 mm to about 59 mm. The information 106 which identifies an individual is recorded between the information recording area 501 and the hole 502. The shape is a stripe-like barcode which has a low reflection coefficient with respect to the read-write light and is an aggregation of diametrical parallel lines, and the information is recorded as the widths of the lines and the intervals between the lines are changed.

The laser 401 corresponds to unique identification information recording means according to the present invention.

In the case of a rewritable optical disk, the intensity of the laser 401 is modulated by an intensity modulator 604 based on the information which identifies an individual which is generated by an individual identification information signal generator 605, and the laser 401 whose intensity is modulated is irradiated upon the phase-change recording film which forms the first information layer 102 while rotating the first substrate 101 with a motor 602. The phase-change recording film irradiated with the laser 401 accordingly has a crystal phase which exhibits a high reflection coefficient with respect to the read-write light, whereas the phase-change recording film not irradiated with the laser 401 remains in an amorphous phase which has a low reflection coefficient. The portions not irradiated with the laser 401 serve as lines having low reflection coefficients, whereby a recording pattern is created. In reality, recording is realized with a recording power remaining at 0.5 W through 2.0 W and the irradiation beam shaped by a laser beam shaping optical system 601 as a long and narrow shape elongated along the radial direction of the substrate, e.g., a shape which is 100 µm×1 µm. Thus shaped laser is irradiated while cyclically shifting the laser in the radial direction, so that a pattern like a barcode having any desired lengths and intervals is obtained.

If the same laser is used as the laser for recording the information which identifies an individual and the laser for initially crystallizing the phase-change recording film, the steps (4*c*), (4*e*) and the like are simplified (However, such initial crystallization may be omitted during manufacturing of a reproduction-only optical disk (ROM).).

Further, although the foregoing has described the recording in the BCA by means of a change in phase condition, the recording may be attained in the BCA by feeding a strong recording power and dissolving the phase-change recording film.

A reproduction-only optical disk does not comprise the phase-change recording film but comprises only the metal thin film. Hence, the information which identifies an individual is provided, with the metal thin film dissolved and accordingly removed using a high-output laser such as a YAG laser. More specifically, the laser beam shaping optical system 601 shapes the laser 401 into a shape of about 10 µm×about 1.2 mm, and after the intensity of the laser 401 is modulated by the intensity modulator 604 based on the information which identifies an individual, the laser 401 is irradiated upon the metal thin film. The metal thin film irradiated with the laser 401 is dissolved and removed due to the generated heat, and accordingly exhibits a low reflection coefficient. In this manner, a recording pattern is formed as lines whose reflection coefficients are low.

The information which identifies an individual may be recorded by means of tracking servo over the irregular topography. This makes it possible to record at an accurate position.

In the case of a write-once-read-many optical disk, a laser whose wavelength is close to that of the read-write light is shaped in a similar manner to that for a rewritable optical disk, and irradiated upon the dye recording film which forms the information layer. The reflection coefficient becomes low in portions irradiated with the laser, whereby the recording pattern is created.

The method described above according to the first preferred embodiment which demands to record postscript information in one of the substrates and bond the substrates to each other is close to a conventional method which is used for a DVD. Since this requires only a small number of modifications, easy manufacturing is possible.

The identification information 106 which identifies an individual may be recorded in the second information layer 104. Recording in the first information layer 102 has an advantage that handling is easy since the first information layer 102 is located on the first substrate 101 which is the thickest, whereas recording in the second information layer 104 has an advantage that since the second information layer 104 is closer to the incident surface of the read-write light than the first information layer 102 is, the read-write light 107 is led to a focus quickly and detection of the information is therefore easy.

SECOND PREFERRED EMBODIMENT

FIG. 7 is a drawing which shows steps of manufacturing an optical disk according to the second preferred embodiment. The first substrate 101 is comprised of a synthetic resin such as polycarbonate, glass or metal, and formed by an injection molding method, the 2P method or the like using a stamper which is manufactured in a similar manner to that used in the first preferred embodiment (Step (7*a*)). The first information layer 102 is comprised of a reflection film formed by a metal thin film of aluminum or the like and a phase-change recording film which is rewritable and held between dielectric films, and is formed by sputtering or otherwise disposing the metal thin film, the dielectric film, the phase-change recording film and the dielectric film in this order (Step (7*b*)).

After forming the first information layer 102, the information 106 which identifies an individual is recorded (Step (7*c*)). A method of recording is similar to that used in the first preferred embodiment. In addition, at this stage, the phase-change recording film of the first information layer 102 is initially crystallized in an area except for those portions in which the individual identification information 106 is recorded.

Following this, a UV light hardening resin 702 is applied on the first information layer 102 and a stamper 701 is placed on this (Step (7d)), and the substrate 101 and the stamper 701, which are bonded to each other such that the UV light hardening resin 702 has desired thickness, are rotated. UV light 703 is irradiated upon the UV light hardening resin 702 and the UV light hardening resin 702 is accordingly hardened (Step (7e)), and the stamper 701 is separated from the UV light hardening resin 702 (Step (7f)). The convex and concave recording tracks on the stamper 701 are thus transferred onto the UV light hardening resin 702.

Next, the second information layer 104 is formed on the UV light hardening resin 702 (Step (7g)). Like the first information layer 102, the second information layer 104 comprises a rewritable phase-change recording film which is held between dielectric films, and further, a reflection film formed by a metal thin film of silver alloy or the like if necessary, and is formed by sputtering or otherwise disposing the dielectric film, the phase-change recording film and the dielectric film in this order. The phase-change recording film of the second information layer 104 is initially crystallized at this stage.

At last, the UV light hardening resin 702 is applied onto the second information layer 104 and the second substrate 105 is bonded to this (Step (7h)), and this is rotated such that the UV light hardening resin 702 will have desired thickness, and after this, UV light is irradiated, the UV light hardening resin 702 is hardened and the disk is completed (Step (7i)).

Alternatively, the second phase-change recording film may be initially crystallized and the information 106 which identifies an individual may be recorded after forming the second information layer 104. In this case, the first phase-change recording film is initially crystallized over the entire surface in advance. With the identification information 106 which identifies an individual recorded in the second information layer 104 which is closer to the incident surface of the read-write light, fast leading to a focus is realized, and therefore, detection of the information is quick and easy.

Figure 8:
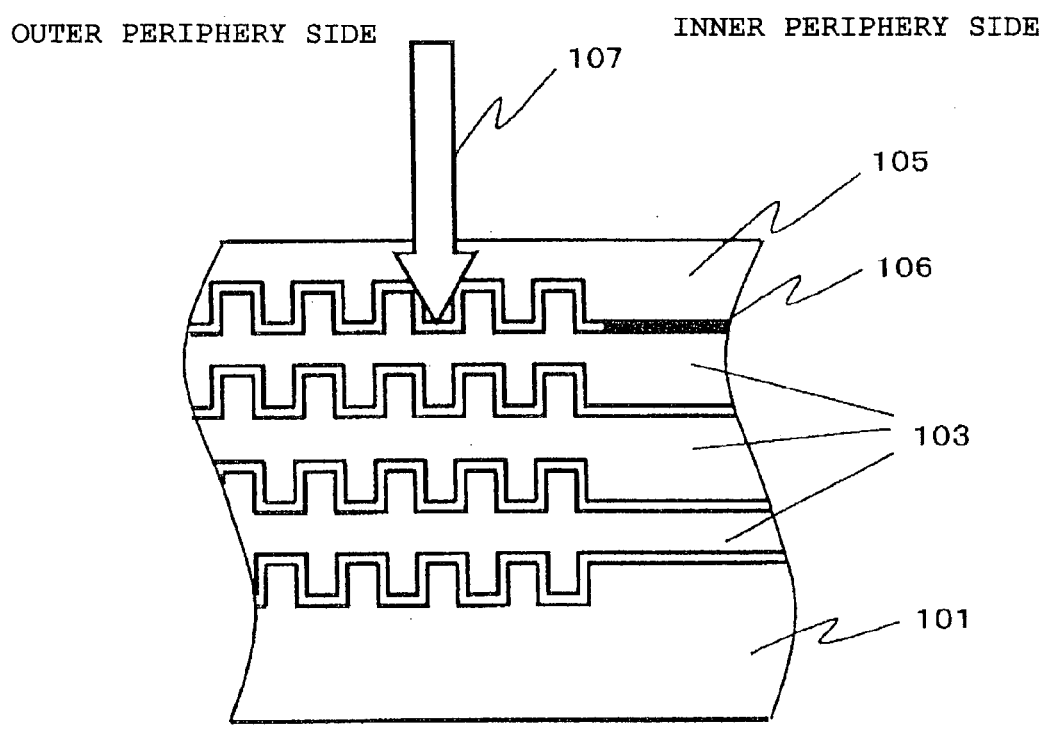
FIG. 8 is a cross sectional view of an optical recording medium according to the second preferred embodiment which comprises three or more information layers.

It is possible to manufacture an optical disk which comprises three or more information layers with the manufacturing method according to the second preferred embodiment, and when an optical disk which comprises three or more information layers is to be fabricated, the disk is manufactured by returning to the step (7d) from the step (7g) and repeating the step (7d) through the step (7g) over a necessary number of times. During this, the information which identifies an individual may be provided prior to the bonding step (7h) instead of providing the information which identifies an individual at the step (7c). (FIG. 8 shows an optical recording medium which comprises four information layers, in which the information identifying an individual is recorded in the information layer which is the closest to the incident surface of the read-write light.)

Of course, the information 106 identifying an individual may be recorded in the first information layer 102 and the second information layer 104 but at positions which do not overlap with each other as viewed from the read-write light. In this case, although the sequence proceeds to the step (7h) via the step (7c) from the step (7g), since an individual identification information recording beam emitted from the laser 401 is modified for each layer and recording positions in the respective information layers are changed, it is possible to reproduce without an influence of other layers during reproduction. This makes it possible to manufacture an optical recording medium which comprises a plurality of information layers for holding information so that by means of incident light, (1) information will be reproduced or (2) information will be recorded and reproduced, wherein there are unique identification information recording areas, in which the unique identification information uniquely given to the optical recording medium is recorded, disposed in two or more of the plurality of information layers so as not to overlap with each other as viewed from a direction of the incident light.

This is applicable to an optical recording medium of other shapes which are not limited only to a disk-like shape but include a card-like shape.

THIRD PREFERRED EMBODIMENT

Figure 9:
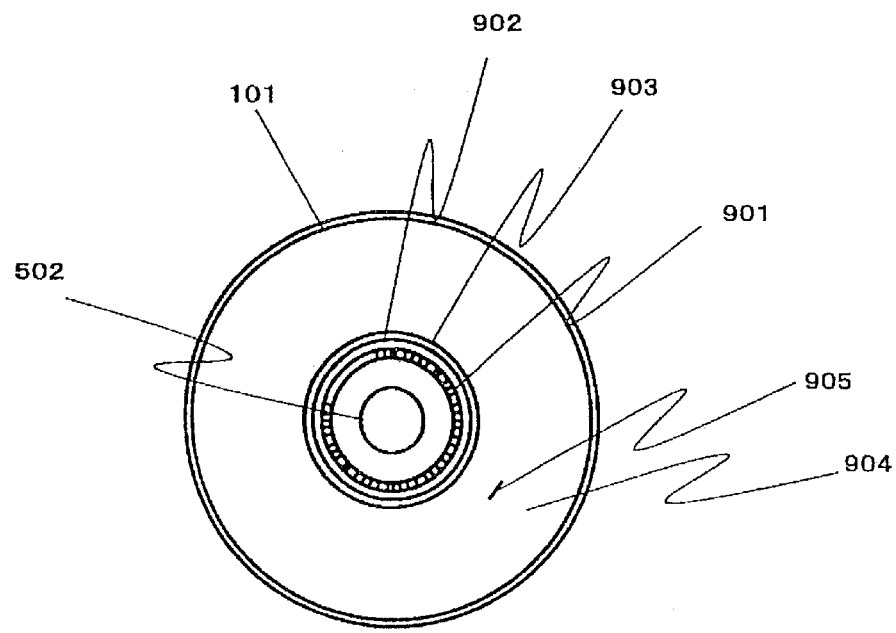
FIG. 9(a) is a drawing which shows an optical disk according to a third preferred embodiment, in which recorded in a BCA area 901 is information regarding a position at which individual identification information 905 is recorded.
FIG. 9(b) is a drawing which shows an optical disk according to the third preferred embodiment, in which recorded in a lead-in area 902 is information regarding a position at which the individual identification information 905 is recorded.
Figure 9:
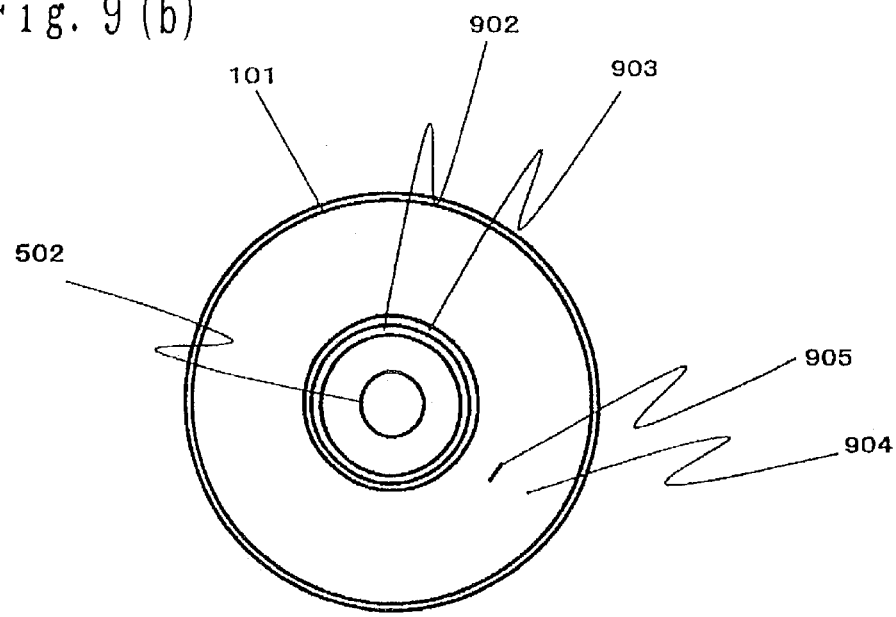

FIGS. 9(a) and 9(b) are drawings of an optical disk according to the third preferred embodiment which comprises an information layer for holding information so that by means of incident light, (1) information will be reproduced or (2) information will be recorded and reproduced, wherein there is a predetermined position information recording area in which information regarding a position at which the individual identification information 905, which is given uniquely to the optical disk is recorded, is recorded.

The position information recording area according to the present invention corresponds to a BCA area 901 in the optical disk shown in FIG. 9(a) but to a lead-in area 902 in the optical disk shown in FIG. 9(b).

The optical disk shown in FIG. 9(a) is divided into the BCA area 901, the lead-in area 902, a learning area 903 and a data area 904, but into the lead-in area 902, the learning area 903 and the data area 904 in the optical disk shown in FIG. 9(b). Although the BCA area 901 and the learning area 903 are disposed separately in these examples, the BCA area 901 and the learning area 903 may be disposed as one integrated area instead of particularly separating the two.

The lead-in area 902 contains data which are constituted by pre-pits. Since the pre-pits are created while a molding board for optical disks is manufactured, the pre-pits are data common to all optical disks which are made from one molding board for optical disks. The content of the data is the number assigned to the molding board for optical disks, an optimal intensity value of the laser light to read the data recorded on the optical disks, etc.

Recording in the BCA area 901 is realized utilizing a physical or optical irreversible reaction. A detailed recording method is as described in relation to the first preferred embodiment. However, in order to obtain a desired pattern, the laser needs be shaped into a beam differently.

The learning area 903 is an area in which the intensity of the laser light for recording or reproduction is adjusted or learned while irradiating the laser light upon this area with an optical disk set in an optical disk apparatus. The data area 904 is an area for recording or reproducing ordinary data.

In the third preferred embodiment, the information (e.g., layers, addresses) expressing a recording position of the information identifying an individual is recorded in the BCA area 901 in the case of the optical disk shown in 9a but in the lead-in area 902 in the case of the optical disk shown in 9b. The individual identification information 905 itself for an actual individual is recorded, by means of a laser, in the data area 904 which is an area other than the BCA area 901, the lead-in area 902 and the like. (The individual identification information 905 may be recorded in a control area for example which is for recording control data.)

The laser corresponds to means which includes the unique identification information recording means and the position information recording means.

For recording or reproduction, an operation is performed in which the information in the BCA area 901 or in the lead-in area 902 is read, and after confirming the recording position of the individual identification information 905, the individual identification information is confirmed. With the two stages of confirmation of the individual identification information incorporated in this manner, it is possible to dramatically improve a capability of preventing unauthorized copying and bootleg editions.

Figure 10:
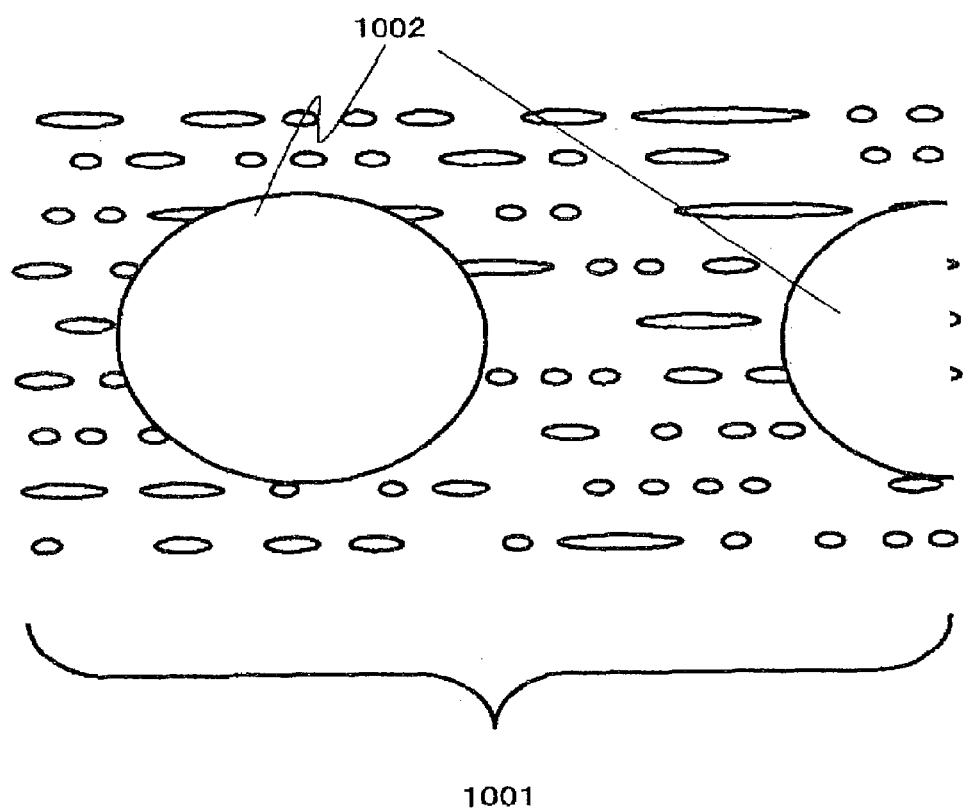
FIG. 10 is a drawing which shows information for identifying an individual according to the third preferred embodiment.

FIG. 10 shows one example of the information identifying an individual which is recorded in the actual data area 904. The records of the individual identification information 905 for identifying an individual are along the recording tracks which, partially or as they include the lengths, the intervals, the radial positions, the address positions and the layer positions, express 0 or 1. The lengths as described herein do not merely denote the lengths along the periphery direction but also the lengths in the radial direction, i.e., the sizes.

In addition, the illustrated example is the record across five tracks, and the information identifying an individual may be over a width corresponding to one track or more in this manner. When the width is across one track alone, there is an advantage that only a small range of error correction is needed during reproduction of user data 1001. At this stage, the information identifying an individual may be recorded under tracking servo. This permits to record at accurate positions.

Marks 1002 for identifying an individual to be recorded have lengths which enable error correction (which are equal to or shorter than a maximum length which enables error correction). Hence, even when the marks 1002 are recorded in the data area, since error correction is possible during reproduction, the content of the original user data 1001 will not become impossible to read. This eliminates the necessity of disposing the inner peripheral area. As a result, the data area is expanded in area size, which in turn allows to increase the storage capacity. This is more effective, as disks are smaller in diameter. Further, this can be regarded as a very large effect, since a limited area is utilized effectively.

In addition, the individual identification information may be recorded in the lead-in area 902 or an lead-out which is located at the outer-most periphery, instead of recording in the data area 904. A similar effect is obtainable, even with the recording in the lead-in area 902 or the lead-out area.

The first through the third preferred embodiments have been described in detail above.

As the foregoing has described, with respect to the optical recording medium or the method of manufacturing an optical recording medium according to the present invention, in the optical recording medium comprising the plurality of information layers, as the information identifying an individual is additionally recorded in one of the information layers, the individual identification information is recorded in that information layer in an optimal fashion without influenced by the other information layers, and hence, the identification information can be read out accurately.

Further, with the identification information recorded in the information layer which is the closest to the incident surface of the read-write light, the information identifying an individual can detected easily and quickly.

Further, in the event that the position of the identification information is recorded instead of recording the identification information itself, the recording area may be reduced while maintaining the compatibility with a DVD.

Further, if the optical disk comprises a plurality of substrates, with the information identifying an individual recorded in the information layer which is in the thickest one of the substrates, handling and manufacturing are easy.

Further, in the event that the information identifying an individual is recorded in at least two information layers in such a manner that the respective pieces of the identification information are not at recording positions which overlap with each other as viewed from the read-write light, it is possible to read the identification information accurately during reproduction without affected by the other layers.

Further, with the position of the information identifying an individual (layers, addresses, etc.) recorded in the lead-in area, it is possible to quickly and easily read the information identifying an individual.

Further, if the information identifying an individual is recorded in the data area, it is possible to expand the data area, and therefore, increase the storage capacity.

Further, if the information identifying an individual is over one track, it is possible to reduce the recording area of the information identifying an individual, and hence, increase the data area.

In addition, the present invention is directed also to a program which works with a computer and makes the computer execute the functions of all or some of the means (or apparatuses, elements, circuits, portions, etc.) of the optical recording medium manufacturing apparatus according to the present invention described above. Of course, computers are not limited to pure hardware such as a CPU but may include firmware, OS and further peripheral equipment.

The present invention is directed also to a program which works with a computer and makes the computer perform the operations at all or some steps (or processes, operations, effects, etc.) of the optical recording medium manufacturing method according to the present invention described above.

Some of the means (or apparatuses, elements, circuits, portions, etc.) according to the present invention and some of the steps (or processes, operations, effects, etc.) according to the present invention refers to some of the means or steps among these plurality of means or steps, or some functions or some operations in one means or at one step.

Some of the apparatuses (or elements, circuits, portions, etc.) according to the present invention refers to some of the apparatuses among these plurality of apparatuses, or some of the means (or elements, circuits, portions, etc.) in one of the apparatuses, or some functions in one of the means.

Also covered by the present invention is a recording medium in which the program according to the present invention is recorded and which can be read on a computer. With respect to use of the program according to the present invention, the program maybe recorded in a recording medium which can be read on a computer and the program may work with the computer. Further, with respect to use of the program according to the present invention, the program may be transmitted in a transmission medium, read on a computer and work with the computer. The recording medium includes a ROM or the like, the transmission medium includes a transmission medium such as the Internet, light, an electric wave, a sound wave and the like.

The structure according to the present invention may be realized by software or software.

Further, the present invention is directed also to a medium which holds a program which makes a computer execute all or some functions of all or some means of the optical recording medium manufacturing apparatus according to the present invention described above, in such a manner that as the program which can be read on a computer is read, the program works with the computer to execute these functions.

The present invention is directed also to a medium which holds a program which makes a computer perform all or some operations at all or some steps of the optical recording medium manufacturing method according to the present invention described above, in such a manner that as the program which can be read on a computer is read, the program works with the computer to perform these operations.

INDUSTRIAL USE

As clearly described above, the present invention is advantageous in that an improved accuracy is realized for reading unique information identifying an individual from an optical disk which comprises a plurality of information layers.

In addition, the present invention is advantageous in that it is possible to reduce a dedicated area for recording unique information identifying an individual.

The invention claimed is:

1. A method of manufacturing an optical recording medium having a plurality of information layers capable of holding information so that by means of incident light, (1) said information will be reproduced or (2) said information will be recorded and reproduced, comprising the steps of:

a) separately forming said plurality of information layers;

b) recording unique identification information, which is unique to said optical recording medium, in a unique identification information recording area in one of said plurality of information layers, before bonding in step c); and c) bonding said plurality of information layers to each other.

2. The optical recording medium manufacturing method of claim 1, wherein said information layer is formed mainly by a phase-change recording film, and said unique identification information is recorded utilizing a modulated intensity of laser light which is for initially crystallizing said phase-change recording film.

3. The optical recording medium manufacturing method of claim 1, wherein said information layer is formed mainly by a reflection film against said light which is indecent, and said unique identification information is recorded utilizing dissolution and consequent removal of said reflection film.

4. A program embodied in a computer readable medium which makes a computer execute the step in the optical recording medium manufacturing method of claim 1 of forming said unique identification information recording area in one of said plurality of information layers and recording said unique identification information in said unique identification information recording area.

* * * * *

UNITED STATES PATENT AND TRADEMARK OFFICE
CERTIFICATE OF CORRECTION

| | | |
|---|---|---|
| PATENT NO. | : 7,239,601 B2 | Page 1 of 1 |
| APPLICATION NO. | : 10/169462 | |
| DATED | : July 3, 2007 | |
| INVENTOR(S) | : Shuji Sato et al. | |

It is certified that error appears in the above-identified patent and that said Letters Patent is hereby corrected as shown below:

Page 2, Item (56) References Cited, FOREIGN PATENT DOCUMENTS
change "WO    WO  98/58368 A    12/1998"
to -- WO    98/58368 A    12/1998 --

Page 2, Item (56) References Cited, FOREIGN PATENT DOCUMENTS
change "WO    WO  00/23990    4/2000"
to -- WO    00/23990    4/2000 --

Page 2, Item (56) References Cited, FOREIGN PATENT DOCUMENTS
change "WO    WO  01/73784 A1    10/2001"
to -- WO    01/73784 A1    10/2001 --

Signed and Sealed this

Eighteenth Day of December, 2007

JON W. DUDAS
*Director of the United States Patent and Trademark Office*